(12) United States Patent
Adachi et al.

(10) Patent No.: US 7,708,310 B2
(45) Date of Patent: May 4, 2010

(54) STEERING COLUMN INCLUDING AN AIRBAG APPARATUS

(75) Inventors: Yuichi Adachi, Aichi-ken (JP); Kazuaki Bito, Aichi-ken (JP); Osamu Fukawatase, Aichi-ken (JP); Kenji Imamura, Kosai (JP); Akiyoshi Sanada, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 244 days.

(21) Appl. No.: 12/073,165

(22) Filed: Feb. 29, 2008

(65) Prior Publication Data
US 2008/0211212 A1     Sep. 4, 2008

(30) Foreign Application Priority Data
Mar. 1, 2007     (JP) .............................. 2007-051707

(51) Int. Cl.
*B60R 21/203* (2006.01)
(52) U.S. Cl. ...................................... 280/731; 280/750
(58) Field of Classification Search .................. 280/731, 280/732, 750, 751, 752, 771, 775
See application file for complete search history.

(56) References Cited

U.S. PATENT DOCUMENTS

| 5,280,956 A | * | 1/1994 | Tanaka et al. ................ 280/777 |
| 5,570,901 A | * | 11/1996 | Fyrainer .................. 280/730.1 |
| 7,226,075 B2 | * | 6/2007 | Nagata et al. ................ 280/731 |
| 7,370,881 B2 | * | 5/2008 | Takimoto et al. ......... 280/730.1 |
| 7,384,065 B2 | * | 6/2008 | Takimoto et al. ............ 280/732 |
| 2008/0116669 A1 | * | 5/2008 | Adachi et al. ............ 280/730.1 |

FOREIGN PATENT DOCUMENTS

| JP | 02200570 A | * | 8/1990 |
| JP | A-9-104317 | | 4/1997 |
| JP | A-10-071911 | | 3/1998 |
| JP | A-2001-106013 | | 4/2001 |
| JP | A-2002-037003 | | 2/2002 |

* cited by examiner

*Primary Examiner*—Paul N Dickson
*Assistant Examiner*—Nicole Verley
(74) *Attorney, Agent, or Firm*—Posz Law Group, PLC

(57) ABSTRACT

The steering column includes a column body, a column cover formed into a generally tubular contour and mounted around the column body and an airbag apparatus. The column cover includes an upper cover and a lower cover. The lower cover is separable from the upper cover and is split into a front section disposed proximate the airbag apparatus and a rear section disposed proximate a combination switch unit disposed at the rear of the airbag apparatus inside the column cover. The rear section is configured separable from the front section as is secured to the column body.

5 Claims, 6 Drawing Sheets

STEERING COLUMN INCLUDING AN AIRBAG APPARATUS

The present application claims priority from Japanese Patent Application No. 2007-051707 of Adachi et al., filed on Mar. 1, 2007, the disclosure of which is hereby incorporated into the present application by reference.

BACKGROUND OF THE INVENTION

1. Field of the Invention

The present invention relates to a steering column of vehicle including an airbag apparatus for knee protection, and more particularly, relates to a steering column including a folded-up airbag stored on an inner side of a lower region of a column cover for deployment to protect knees of a driver seated in a driver's seat.

2. Description of Related Art

A steering column including an airbag apparatus for knee protection is known from JP 2002-37007. The steering column includes a column body, a column cover covering the column body and an airbag apparatus embedded inside a lower region of the column cover. The airbag apparatus includes an airbag, an inflator and a case housing the airbag and inflator. The case is secured to the column body and is covered by the column cover at the underside.

Although not described in the above prior art, a steering column is normally provided at the vicinity of the rear end with a combination switch unit embedded inside the column cover and including a plurality of switches such as a light switch and windshield wiper switch disposed in such a manner as to project from the steering column. In an instance where the column cover has a tubular contour for covering the column body in a conventional manner, a whole column cover needs to be removed to do maintenance on the switch unit. If the steering column includes an airbag apparatus inside the column cover, the removal work of the column cover is accompanied by disconnection of the column cover from the airbag apparatus. This complicates the removal work.

SUMMARY OF THE INVENTION

The object of the present invention is to provide a steering column including an airbag apparatus that has improved workability in maintenance.

The object of the present invention is achieved by a steering column having the following structure:

The steering column includes a column body, a column cover formed into a generally tubular contour and mounted around the column body, an airbag apparatus for knee protection including an inflatable airbag that is folded up and stored at an inner side of a lower region of the column cover and is adapted to emerge from the column cover and deploy for protecting knees of a driver seated in a driver's seat when fed with inflation gas, and a combination switch unit disposed inside the column cover at the rear of the airbag apparatus on a same line extending along the axial direction of the column body, the switch unit including a plurality of switches disposed to project from the column cover for operation by a driver. The column cover includes an upper cover and a lower cover that are split along a parting plane extending along the axial direction of the column body. The upper cover has an inverse-U shaped section when taken perpendicularly to the axial direction of the column body. The lower cover has a U-shaped section when taken perpendicularly to the axial direction of the column body. The lower cover of the column cover is split into a front section disposed proximate the airbag apparatus and a rear section disposed proximate the switch unit both of which are separable from the upper cover. The rear section of the lower cover is configured separable from the front section as is secured to the column body.

With the above steering column, the lower cover for covering the underside of the column body has an anteroposteriorly split configuration, and the rear section is configured separable from the front section as is secured to the column body. This structure will allow only the rear section to be removed after taking off the steering wheel from the rear end of the column body even after the steering column is mounted on vehicle. The removal of the rear section uncovers a bottom region of the switch unit so harnesses of the switch unit can be handled for maintenance. If the upper cover is further taken off, the switch unit is rendered detachable from the column body, so that the switch mechanism itself can be handled for maintenance. That is, the steering column of the invention enables the maintenance work of the switch unit without disconnecting the airbag apparatus and the front section of the lower cover.

Therefore, the steering column of the invention has an improved workability in maintenance.

The above steering column is desirably configured such that:

the airbag apparatus further includes an inflator for feeding inflation gas to the airbag and a case that houses the airbag and the inflator and has an opening at least at a lower side thereof;

the airbag apparatus is assembled with the front section of the lower cover into an assembly unit such that the front section is mounted on the column body together with the airbag apparatus by securing the case as stores the airbag and inflator to a column tube of the column body;

the front section integrally includes a door covering the opening of the case and openable for allowing the airbag to emerge therefrom and an engaging section engageable with a bottom region of the upper cover at an upper region thereof facing the upper cover; and the assembly unit of the front section of the lower cover and the airbag apparatus is mounted on the column body in advance of the switch unit.

This configuration does not limit the mounting direction of the airbag apparatus on the column body since the airbag apparatus is mounted on the column body in advance of the switch unit, and therefore improves the manageability of the airbag apparatus in the mounting work on the column body as well as mounting the same on the column body robustly. Furthermore, the front section is provided at the upper region facing the upper cover with the engaging section engageable with the bottom region of the upper cover. The engaging section will facilitate the positioning and connecting work of the upper cover relative to the front section and thereby facilitating the mounting work of the upper cover on the front section that is secured to the column body beforehand.

It is further desired that the upper cover and the rear section of the lower cover are configured mountable on the column body by being fastened together to the switch unit secured to the column body by screws at a position on rear sides of the upper cover and the rear section adapted to be hidden by a steering wheel when mounted on a vehicle.

With the above configuration, removal of the screws fastening the upper cover and the rear section together will render the upper cover and the rear section detachable from the column body, and thereby facilitating the maintenance work. Moreover, since the fastening position to the switch unit is hidden by the steering wheel when mounted on a vehicle, the appearance of the steering column is kept good.

In addition, if a front edge of the rear section and a rear edge of the front section of the lower cover are provided with steps engageable with each other, the front edge of the rear section and the rear edge of the front section are joined in an even manner. Accordingly, the appearance of the steering column is further improved.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

A steering column SC embodying the present invention is shown in FIGS. 1-5 as includes a column body 1 adapted for connection to a steering wheel SW, a column cover 10 having a generally tubular contour for covering the column body 1, a knee-protecting airbag apparatus AM disposed on an inner side of a lower region of the column cover 10 and a combination switch unit 59 located at the rear of the airbag apparatus AM inside the column cover 10.

Unless otherwise specified, front/rear direction in the following embodiments is intended to refer to a direction extending along the axial direction of the column body 1 of the steering column SC as is mounted on a vehicle. Up/down direction is intended to refer to a vertical direction of vehicle that is orthogonal to the axial direction of the column body 1, and left/right direction is intended to refer to left/right direction of vehicle that is orthogonal to the axial direction of the column body 1.

Figure 3:
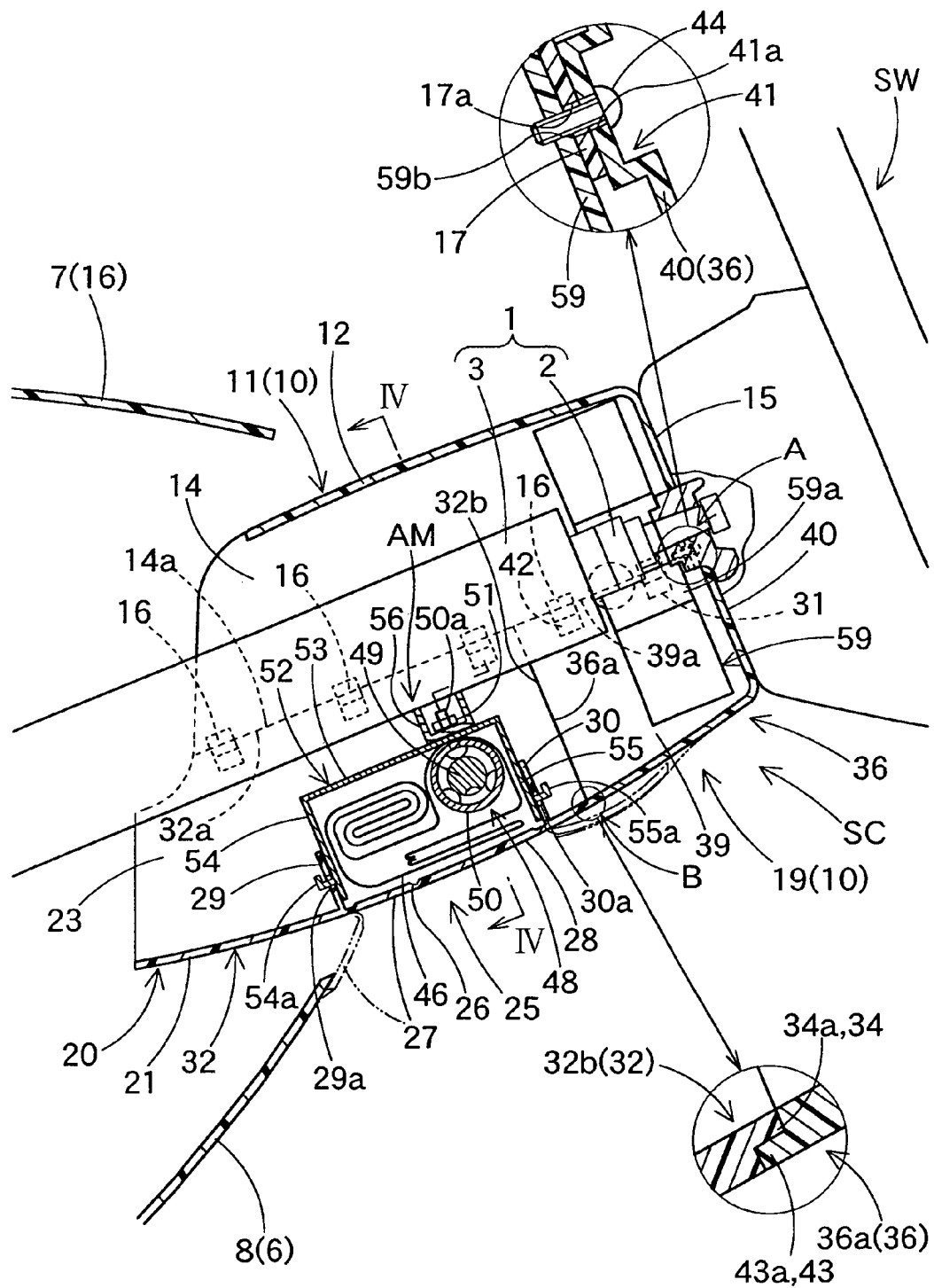
FIG. 3 is a schematic enlarged vertical section of the steering column of FIG. 1 taken along the anteroposterior direction of the vehicle.

As shown in FIG. 3, the column body 1 includes a main shaft 2 having a round bar contour and connected to the steering wheel SW and a column tube 3 having a generally cylinder contour and mounted around the main shaft 2. The main shaft 2 is adapted to rotate along with rotation of the steering wheel SW and transmit the rotation of the steering wheel SW to an unillustrated steering gear. The column tube 3 does not rotate along with the rotation of the steering wheel SW.

Figure 1:
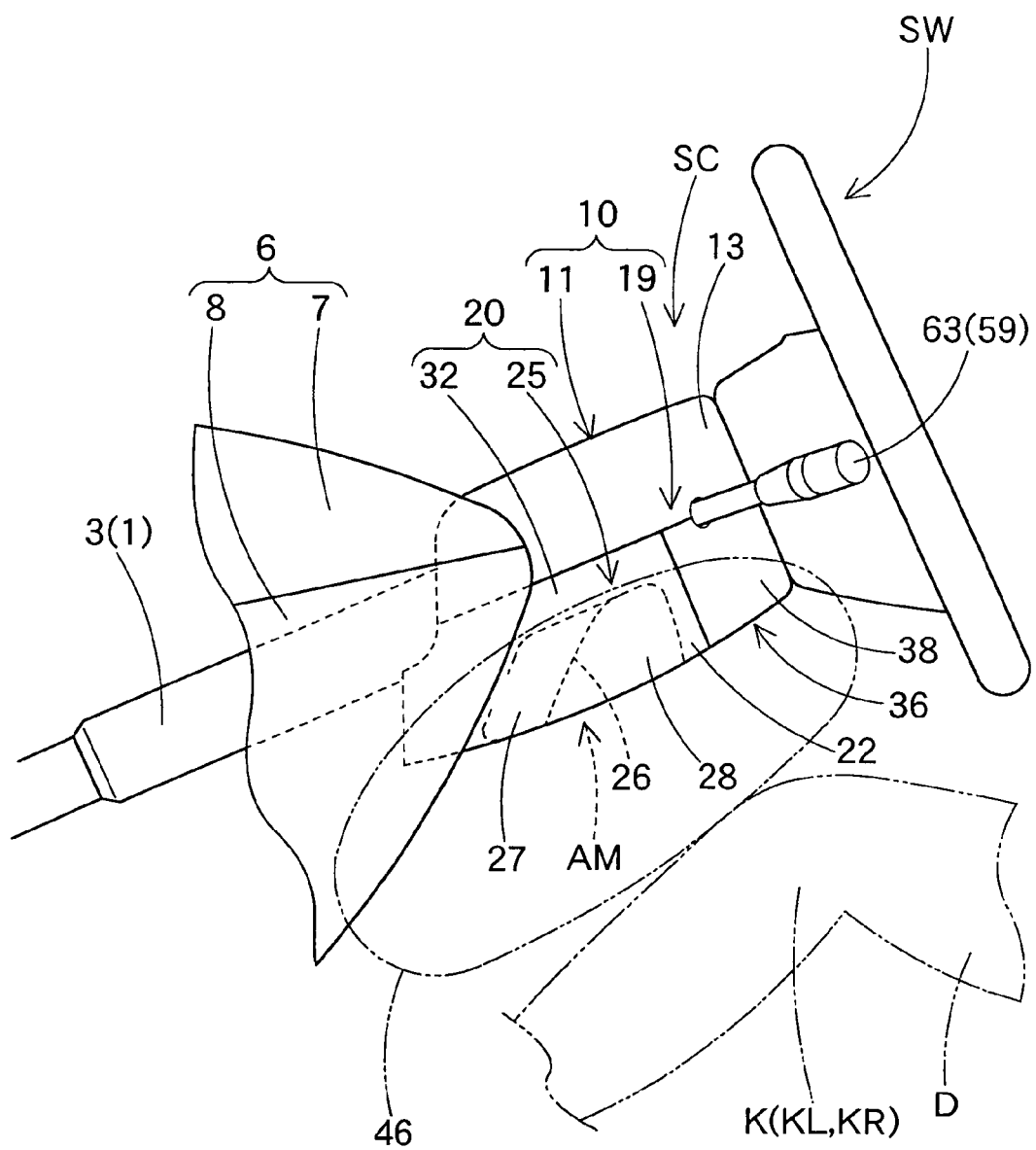
FIG. 1 is a schematic side view of a steering column including an airbag apparatus embodying the invention as is mounted on a vehicle.
Figure 2:
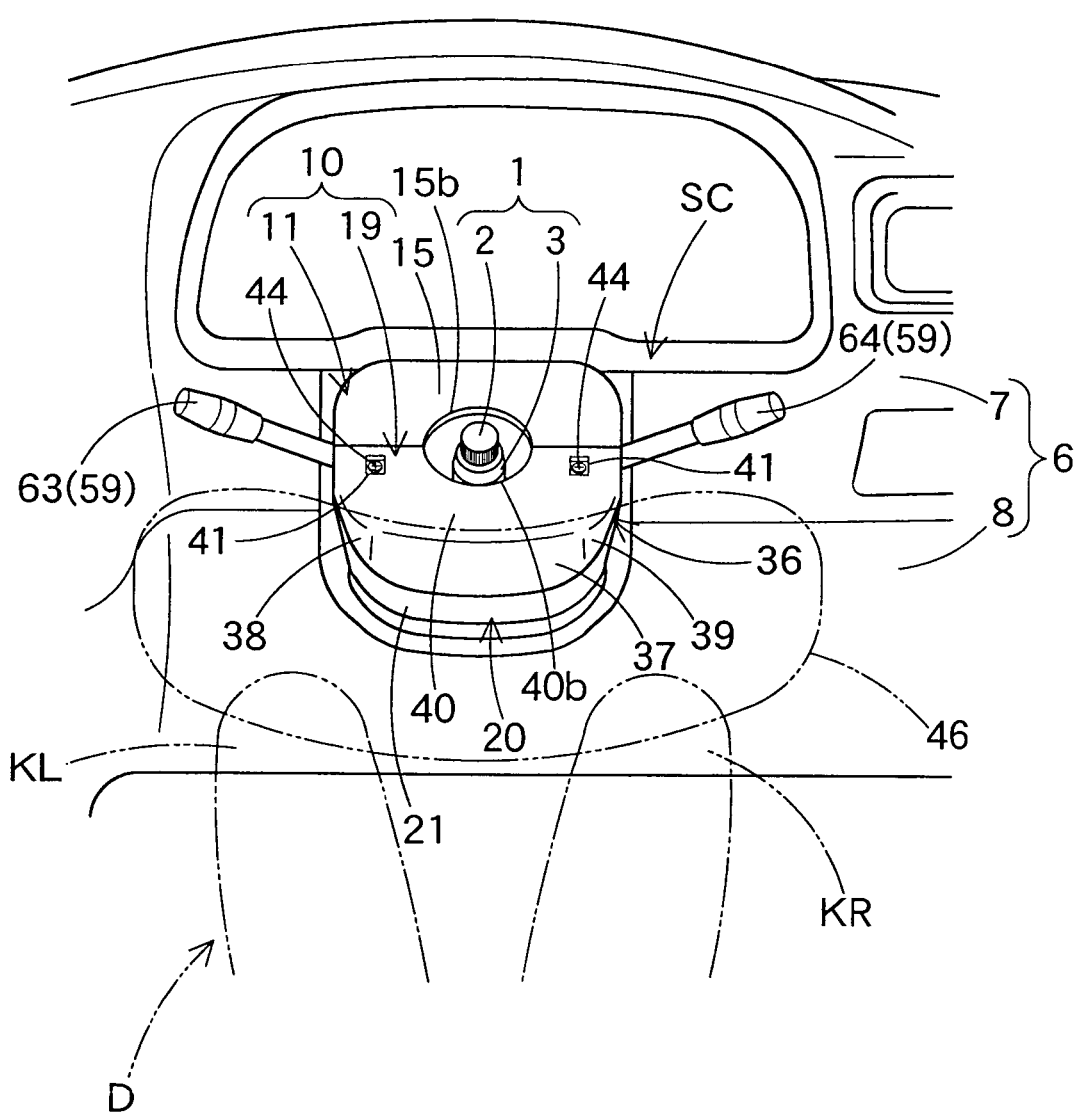
FIG. 2 is a schematic front view of the steering column of FIG. 1 as viewed from the rear of the vehicle.

The column cover 10 is made from synthetic resin and has a generally square tubular contour for covering the column body 1. As shown in FIGS. 1 to 3, the column cover 10 is disposed in front of a driver's seat in such a manner as to project rearward from the instrument panel or dashboard 6. The dashboard 6 includes an upper panel 7 disposed on the upper side and a lower panel 8 disposed on the lower side.

The column cover 10 includes an upper cover 11 and a lower cover 19 that are split into two along a plane expanding along the axial direction of the column body 1.

Figure 4:
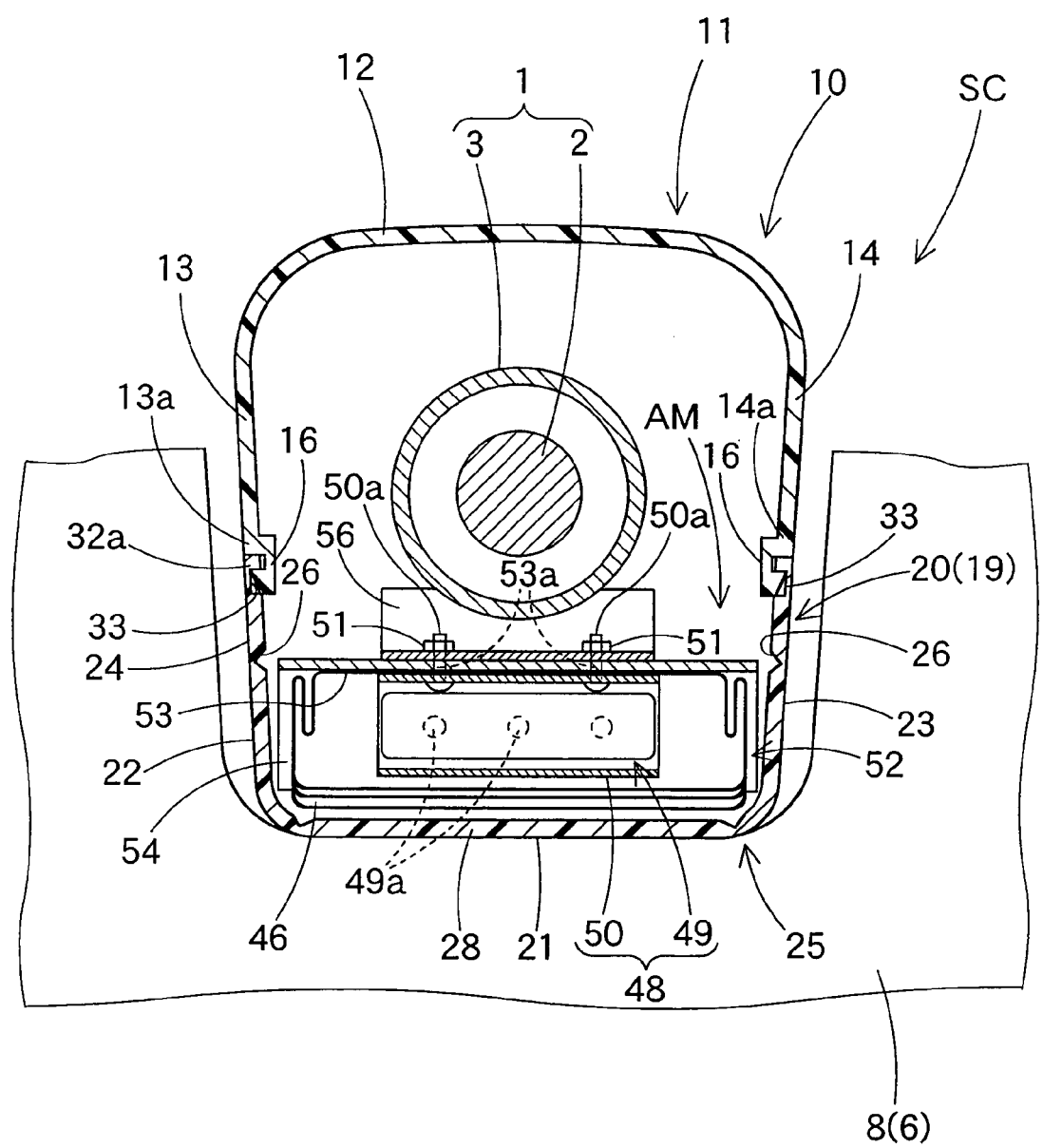
FIG. 4 is a schematic vertical section of the steering column of FIG. 1 taken along line IV-IV of FIG. 3.
Figure 5:
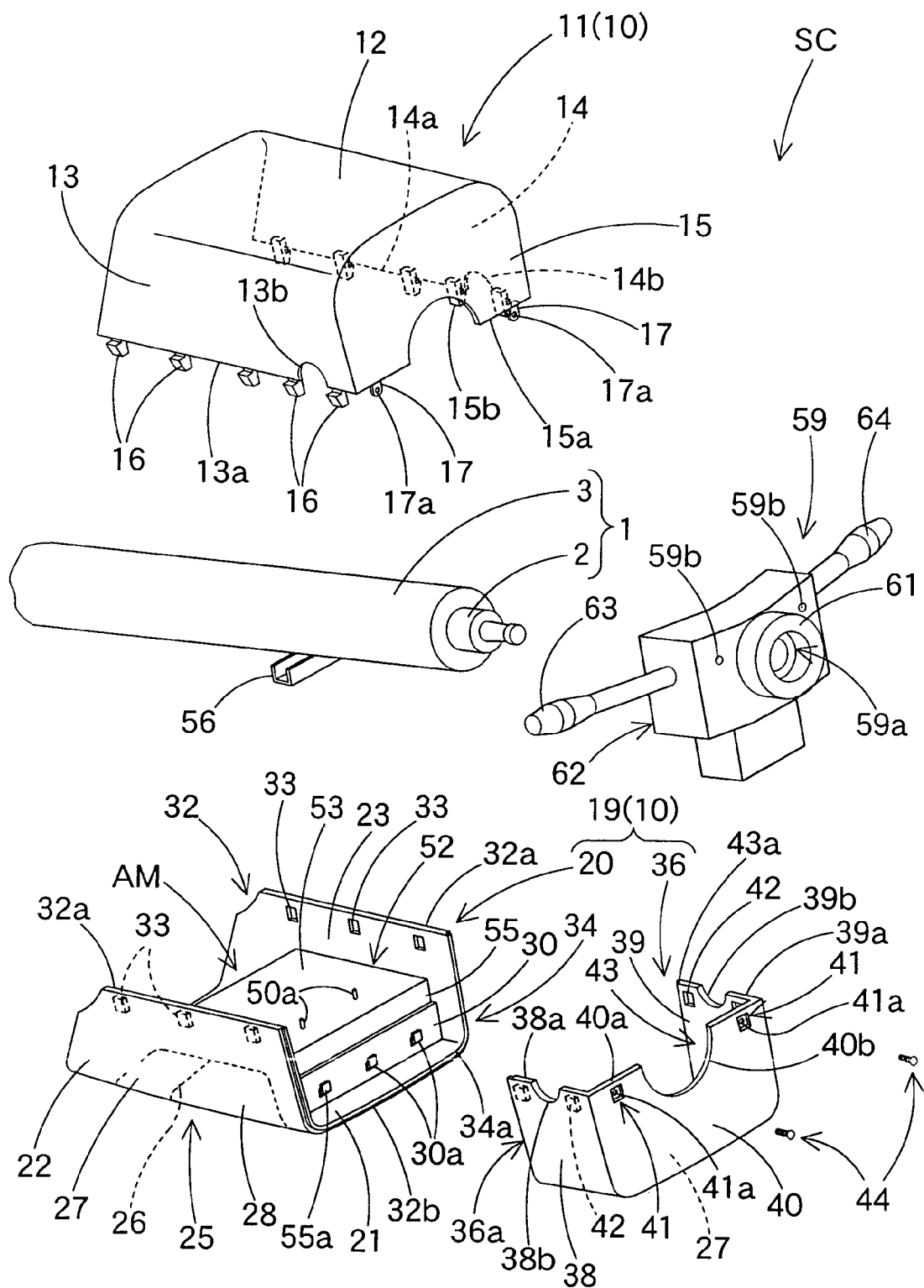
FIG. 5 is a schematic perspective exploded view showing a column body, a column cover, an airbag apparatus and a switch unit of the steering column of FIG. 1.

The upper cover 11 has a generally inverse-U section when taken perpendicularly to the axial direction of the column body 1 as shown in FIG. 4, and is closed at the rear end to cover upper halves of the column body 1 and the switch unit 59 secured to the column body 1 (FIGS. 1-4). The upper cover 11 includes a top wall 12 covering the column body 1 and the switch unit 59 from above, a left side wall 13 and right side wall 14 covering laterals of the column body 1 and the switch unit 59 and a rear wall 15 covering the rear side of the switch unit 59. As shown in FIG. 5, the left side wall 13 and right side wall 14 are provided at the lower edge 13a/14a with pawls 16 for engagement with later-described front section 20 and rear section 36 of the lower cover 19. In this specific embodiment, each five of the pawls 16 are formed on the lower edge 13a/14a along the anteroposterior direction.

A recess 15b is formed at the vicinity of the lateral center of the lower edge 15a of the rear wall 15 of the upper cover 11 to receive the main shaft 2. On the left and right sides of the recess 15b in the lower edge 15a are mounting projections 17 each of which extends downward from the rear wall 15 and has a generally round aperture 17a at the leading end. As indicated in an upper encircled region of FIG. 3 showing the enlargement of region A, the mounting projections 17 are used when fastening the upper cover 11 to the switch unit 59 secured to the column body 1 together with the rear section 36 of the lower cover 19 by screws 44. The projections 17 are applied on an inner surface of a later-described rear wall 40 of the rear section 36 at such positions that the apertures 17a conform to apertures 41b of later-described dents 41 of the rear wall 40. At the vicinities of the rear ends of the lower edges 13a and 14a of the left and right side walls 13 and 14 are recesses 13b and 14b for allowing later-described switch regions 63 and 64 of the switch unit 59 to project therefrom. The upper cover 11 further internally includes an unillustrated projection that is used to position the upper cover 11 relative to the switch unit 59 secured to the column body 1. That is, the upper cover 11 is mounted on the column body 1 via the switch unit 59, by being screw 44 fastened to the switch unit 59 secured to the column body 1.

The lower cover 19 has a generally U-shape section when taken perpendicularly to the axial direction of the column body 1 as shown in FIG. 4, and is closed at the rear end to cover lower halves of the column body 1 and the switch unit 59. The lower side of a region of the lower cover 19 emerging from the dashboard 6 is formed into a generally rectangular plate shape rising rearward and upward in a curved manner. The lower cover 19 is split into a front section 20 adapted to be disposed proximate the airbag apparatus AM and a rear section 36 disposed proximate the switch unit 59.

Referring to FIGS. 3, 4 and 5, the front section 20 of the lower cover 19 includes a bottom wall 21 covering the column body 1 from below, and a left side wall 22 and a right side wall 23 covering laterals of the column body 1. The front section 20 includes an airbag cover region 25 covering an airbag 46 of the airbag apparatus AM and a general region 32 surrounding the airbag cover region 25 (FIG. 1). The airbag cover region 25 includes a front door 27 and a rear door 28 formed on the region emerging from the dashboard 6, a mounting wall 29 formed at the front end of the front door 27 and a mounting wall 30 formed at the rear end of the rear door 28 (FIGS. 1 and 3). The front door 27 and rear door 28 in this embodiment are formed to range from the bottom wall 21 to left and right side walls 22 and 23, and are provided along the circumferences with tearable portions 26 adapted to be torn when the doors are pushed by the airbag 46 being inflated (FIGS. 1, 3 and 4). The front door 27 is designed to open its rear edge forward while the rear door 28 opens its front edge rearward when the tearable portions 26 are torn. The mounting walls 29 and 30 are formed generally along the transverse direction in such a manner as to project generally vertically inward from the front section 20 (FIGS. 3 and 5). The mounting walls 29 and 30 have a plurality of apertures 29a/30a disposed side by side along the transverse direction for engagement with later-described pawls 54a/55a of the airbag case 52.

The general region 32 is provided on the inner surface in the left and right upper edge 32a regions, i.e., in upper edge regions of the left side wall 22 and right side wall 23, with a plurality (three, in this embodiment) of dents 33 disposed along the anteroposterior direction for engagement with the pawls 16 of the upper cover 11. As shown in FIG. 5 and as indicated in a lower encircled region of FIG. 3 showing the enlargement of region B, the rear edge region 32b of the general portion 32 is formed into a step 34 over the entire length in the transverse direction for good abutment with the rear section 36. In the step 34, specifically, regions of rear edges of the left side wall 22, right side wall 23 and the bottom wall 21 facing inward are formed into projections 34a projecting rearward.

The rear section 36 of the lower cover 19 covers laterals, an underside and rear of the lower half of the switch unit 59 attached to the column body 1. The rear section 36 includes a bottom wall 37 covering the switch unit 59 from below, a left side wall 38 and a right side wall 39 covering the laterals of the switch unit 59, and a rear wall 40 covering the rear of the switch unit 59. The rear wall 40 is provided at the vicinity of the lateral center of the upper edge 40a with a recess 40b for receiving the main shaft 2. On the left and right sides of the recess 40b in the upper edge 40a region are dents 41 each of which is formed in a stepped manner and has a generally round aperture 41a at the leading end of the dent. The apertures 41a of the dents 41 are formed at such positions as to conform to the apertures 17a of the mounting projections 17 of the upper cover 11 and are used when mounting the column cover 10 on a vehicle, such that the screws 44 are inserted through the apertures 41a and 17a for fastening to the switch unit 59 so that the upper cover 11 and the rear section 36 are secured to the column body 1 via the switch unit 59 as shown in the enlargement of region A in FIG. 3. The dents 41 are located on such positions as to be hidden by the steering wheel SW although they are seen in FIG. 2.

At the upper edges 38a and 39a of the left and right side walls 38 and 39 of the rear section 36 are recesses 38b and 39b for allowing the switch regions 63 and 64 of the switch unit 59 to project therefrom. Each of the left and right side walls 38 and 39 is further provided on the inner surface of the upper edge region 38a/39a and in front and rear of the recess 38b/39b with dents 42 for engagement with the pawls 16 of the upper cover 11. The front edge region 36b of the rear section 36 is formed into a step 43 over the entire length in the transverse direction for good abutment with the general portion 32 of the front section 20. In the step 43, regions of front edges of the bottom wall 37, left side wall 38, right side wall 39 facing outward are formed into projections 43a projecting forward. In this embodiment, the rear section 36 is engaged with the front section 20 only by the abutment of the projections 34a and 43a of the steps 34 and 43 to each other as indicated in a lower encircled region of FIG. 3 showing the enlargement of region B. This structure will enable easy removal of the rear section 36 from the front section 20 as secured to the column body 1 merely by taking out the screws 44 and disengaging the pawls 16 of the upper cover 11 from the dents 42.

The airbag apparatus AM is covered by the front section 20 and includes a folded-up airbag 46, an inflator 48 for supplying inflation gas to the airbag 46 and a case 52 housing the airbag 46 and the inflator 48. The case 52 has an opening at least at the lower side.

Figure 6:
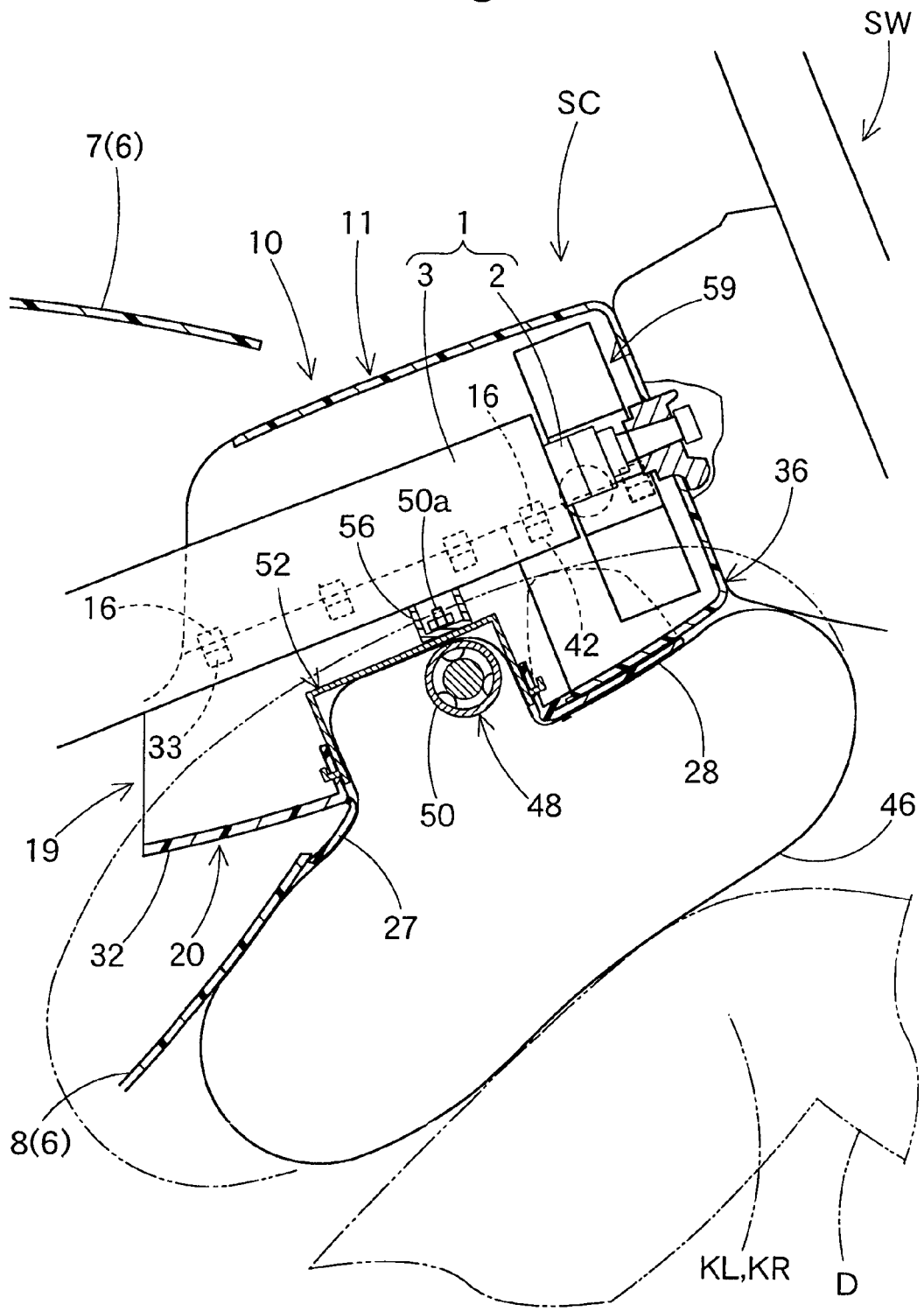
FIG. 6 is a schematic section of an airbag at full inflation taken along the anteroposterior direction of the vehicle.

The airbag 46 is designed to inflate into a horizontally long rectangular board shape in order to protect both knees KL and KR of a driver D as indicated by double-dashed lines in FIGS. 1 and 2 and solid lines in FIG. 6. The airbag 46 is formed of flexible woven fabric of polyester, polyamide or the like, and is stored in the case 52 in a folded-up configuration. The airbag 46 is designed to inflate with inflation gas fed from the inflator 48 that is stored inside the airbag 46 with bolts 50a projected outward, push and open the front door 27 and rear door 28 of the airbag cover region 25 and emerge from an opening provided by the opening of the doors 27 and 28 for covering the underside of the column cover 10 and rear sides of areas of the dashboard 6 below and on the left and right of the column cover 10.

As shown in FIGS. 3 and 4, the inflator 48 includes a cylindrical body 49 disposed so that its axial direction extends along the transverse direction and a generally cylindrical diffuser 50 holding the body 49. The body 49 of this embodiment has gas discharge ports 49a arranged side by side along the transverse direction. An unillustrated lead wire extends from the body 49. The diffuser 50 covers the body 49 all over and is open at the left and right ends so as to allow the inflation gas discharged from the gas discharge ports 49a of the body 49 to flow out from the left and right ends. The diffuser 50 holds the body 49 by clamping the body 49 at more than one position along the periaxial direction. The diffuser 50 includes two bolts 50a for mounting the inflator 48 to a bracket 56 secured to the column tube 3 together with the airbag 46 and the case 52. Each of the bolts 50a is nut 51 fastened to the bracket 56 as shown in FIGS. 3 and 4.

As shown in FIGS. 3 and 4, the case 52 is made of sheet metal and is open at the left, right and lower sides so as to have an inverse-U shaped section. The case 52 includes a top wall 53 and side walls 54 and 55 extending downward from the front and rear ends of the top wall 53. Each of the side walls 54 and 55 is provided proximate the lower end with pawls 54a/55a formed in such a manner as to project outward to be retained by the apertures 29a/30a of the mounting wall 29/30 of the front. section 20. The top wall 53 includes through holes 53a for receiving the bolts 50a of the inflator 48.

Referring to FIG. 5, the switch unit 59 includes a rudder angle sensor 61 and a switch mechanism section 62 that is disposed in front of the sensor 61 and has a plurality of switches 63 and 64. The switches 63 and 64 are disposed in such a manner as to project from laterals of the switch mechanism section 62 for use to turn on lights, windshield wipers, and turn indicator lights. As mounted on a vehicle, the switches 63 and 64 project from the column cover 10 to be oriented upward and are disposed in a generally laterally symmetrical manner relative to the column cover 10. The switch unit 59 further includes unillustrated harnesses for the sensor 61 and switch mechanism 62. The switch unit 59 is further provided with a through hole 59a running through anteroposteriorly for receiving the main shaft 2 of the column body 1 with a not-shown annular clip thereon. The clip is configured radially shrinkable to fasten the main shaft 2 put through the through hole 59a, thereby mounting the switch unit 59 on the main shaft 2.

Mounting of the steering column SC on a vehicle is now described. Preliminarily, the column tube 3 is mounted around the main shaft 2 to form the column body 1, and the bracket 56 is secured to the column tube 3. Then the airbag apparatus AM is assembled as follows: the inflator 48 is stored inside the airbag 46 such that the bolts 50a project from the airbag 46, and the airbag 46 is folded to up to size of the case 52. The folded-up airbag 46 and the inflator 48 are stored inside the case 52 such that the bolts 50a protrude from the through holes 53a of the case 52. Unillustrated spring washers are fastened with the bolts 50a for retaining the bolts 50a. Subsequently, the case 52 is assembled with the airbag cover region 25 of the front section 20 of the lower cover 19 by fitting the pawls 54a and 55a of the case 52 in the apertures 29a and 30a of the mounting walls 29 and 39, thereby assembling the front section 20 and the case 52 together into an assembly unit.

Then the bolts 50a projecting from the case 52 are nut 51 fastened to the bracket 56 secured to the column tube 3 so as to mount the front section 20 as well as the airbag apparatus AM on the column body 1. Subsequently, the switch unit 59 is secured to the main shaft 2 using the above-described clip. Then the column body 1 is mounted on the vehicle and the lead wire extending from the inflator 48 is connected to a circuit for actuating the airbag apparatus while the harnesses of the switch unit 59 are connected to another circuit for the switches. Thereafter, the upper cover 11 is fixed to the column body 1 tentatively by setting the pawls 16 in the dents 33 of the front section 20. Then the rear section 36 is set in place by fitting the pawls 16 of the upper cover 11 in the dents 42, and the screws 44 are used to fasten peripheral areas of the apertures 41a of the dents 41 of the rear section 36 and the projections 17 of the upper cover 11 against screw holes 59b of the switch unit 59 shown in FIGS. 3 and 5, thereby mounting the upper cover 11 and the rear section 36 on the column body 1, and mounting the steering column SC on the vehicle.

If an actuating signal is fed to the inflator body 49 via the lead wire after the steering column SC is mounted on the vehicle, the inflator 48 discharges inflation gas from the gas discharge ports 49a into the airbag 46. Then the airbag 46 inflates, pushes and opens the front door 27 and rear door 28 on the front section 20 of the lower cover 19, and projects downward from an opening provided thereby for deployment as indicated by double-dashed lines in FIGS. 1 and 2 and solid lines in FIG. 6.

The lower cover 19 of the steering column SC for covering the underside of the column body 1 has an anteroposteriorly split configuration. Furthermore, the rear section 36 is configured separable from the front section 20 as is secured to the column body 1. This structure allows only the rear section 36 to be removed after taking off the steering wheel SW from the rear end of the column body 1 even after the steering column SC is mounted on vehicle. The removal of the rear section 36 uncovers a bottom region of the switch unit 59 so the harnesses of the switch unit 59 can be handled for maintenance. If the upper cover 11 is further taken off, the switch unit 59 is rendered detachable from the column body 1, so that the switch mechanism 62 itself can be handled for maintenance. That is, the steering column SC enables the maintenance work of the switch unit 59 without disconnecting the airbag apparatus AM and the front section 20.

Therefore, the steering column SC of the embodiment has improved workability in maintenance.

Moreover, the steering column SC of this embodiment is configured such that the airbag apparatus AM is mounted on the column body 1 in advance of the switch unit 59. This configuration does not limit the mounting direction of the airbag apparatus AM on the column body 1, and therefore improves the manageability of the airbag apparatus AM in the mounting work on the column body 1 while mounting the same on the column body 1 robustly. Furthermore, the steering column SC is configured such that the front section 20 of the lower cover 19 is preliminarily assembled with the airbag apparatus AM into a single unit for mounting on the column tube 3 utilizing the case 52 of the airbag apparatus AM. The front section 20 is provided at the upper region 32a facing the upper cover 11 with the dents 33 that act as an engaging section engageable with the bottom region 14a of the upper cover 11. This engaging section 33 will facilitate the positioning and connecting work of the upper cover 11 relative to the front section 20 and thereby facilitating the mounting work of the upper cover 11 on the front section 20 that is secured to the column body 1 beforehand. Although the pawls 16 of the upper cover 11 and the dents 33 of the front section 20 for receiving the pawls 16 act as the engaging section used to join the lower edge 14a of the upper cover 11 and the upper edge 32a of the front section 20 in this specific embodiment, the configuration of the engaging section should not be limited thereby. Alternatively, the upper cover may include dents while the front section includes pawls or the like engageable with the dents.

In the steering column SC, the upper cover 11 and the rear section 36 of the lower cover 19 are mounted on the column body 1 by being fastened together to the switch unit 59 secured to the column body 1 by screws 44 at the position of the mounting projections 17 and dents 41 formed on the rear sides of the upper cover 11 and the rear section 36. With this configuration, removal of the screws 44 will render the upper cover 11 and the rear section 36 detachable from the column body 1, and thereby facilitating the maintenance work. Moreover, the position of the dents 41 to fasten the upper cover 11 and the rear section 36 to the switch unit 59 are adapted to be hidden by the steering wheel SW when mounted on a vehicle, so that the appearance of the steering column SC is kept good.

In addition, the front edge 36a of the rear section 36 and the rear edge 32b of the general region 32 of the front section 20 of the lower cover 19 include steps 34 and 43 engageable with each other thereby joining the front edge 36a of the rear section 36 and the rear edge 32b of the general region 32 of the front section 20 in an even manner. Accordingly, the appearance of the steering column SC is further improved.

In the foregoing embodiment, when mounting the steering column SC on vehicle, the rear section 36 of the lower cover 19 is mounted on the column cover 1 after attaching the upper cover 11 to the column cover 1 tentatively. However, the order of mounting of the upper cover and the rear section should not be limited thereby. The upper cover may alternatively be mounted on the column body after attaching the rear section on the column body tentatively, for example by forming a member for tentative installation and the mounting projections on the rear section, while the dents for receiving the projections on the upper cover.

What is claimed is:

1. A steering column comprising:
   a column body;
   a column cover formed into a generally tubular contour and mounted around the column body, the column cover including an upper cover and a lower cover that are split along a parting plane extending along the axial direction of the column body, the upper cover having an inverse-U shaped section when taken perpendicularly to the axial direction of the column body, the lower cover having a U-shaped section when taken perpendicularly to the axial direction of the column body;

an airbag apparatus for knee protection including an inflatable airbag that is folded up and stored at an inner side of a lower region of the column cover and is adapted to emerge from the column cover and deploy for protecting knees of a driver seated in a driver's seat when fed with inflation gas; and a combination switch unit disposed inside the column cover at the rear of the airbag apparatus on a same line extending along the axial direction of the column body, the switch unit including a plurality of switches disposed to project from the column cover for operation by a driver, wherein the lower cover of the column cover is split into a front section disposed proximate the airbag apparatus and a rear section disposed proximate the switch unit, the front section and the rear section are separable from the upper cover and the rear section is configured separable from the front section as is secured to the column body.

2. The steering column of claim 1, wherein:

the airbag apparatus further includes an inflator for feeding inflation gas to the airbag and a case that houses the airbag and the inflator and has an opening at least at a lower side thereof;

the airbag apparatus is assembled with the front section of the lower cover into an assembly unit such that the front section is mounted on the column body together with the airbag apparatus by securing the case as stores the airbag and inflator to a column tube of the column body;

the front section integrally includes a door covering the opening of the case and openable for allowing the airbag to emerge therefrom and an engaging section engageable with a bottom region of the upper cover at an upper region thereof facing the upper cover; and the assembly unit of the front section of the lower cover and the airbag apparatus is mounted on the column body in advance of the switch unit.

3. The steering column of claim 1, wherein:

the upper cover and the rear section of the lower cover are configured mountable on the column body by being fastened together to the switch unit secured to the column body by screws at a position on rear sides of the upper cover and the rear section adapted to be hidden by a steering wheel when mounted on a vehicle.

4. The steering column of claim 1, wherein:

the front section of the lower cover includes a step at a rear edge thereof and the rear section includes a step at a front edge thereof for engagement with the step of the front section.

5. A method of manufacturing a steering column comprising the steps of:

providing a generally tubular column cover including an upper cover and a lower cover that are configured in such a manner as to split the column cover along a parting plane extending along the axial direction of a column body, the upper cover having an inverse-U shaped section when taken perpendicularly to the axial direction of the column body, the lower cover having a U-shaped section when taken perpendicularly to the axial direction of the column body and having a front section and a rear section;

providing an airbag apparatus for knee protection including an inflatable airbag that is adapted to deploy for protecting knees of a driver seated in a driver's seat, an inflator for supplying inflation gas to the airbag and a case for housing the airbag and inflator, the case having an opening at least at a lower side thereof;

providing a combination switch unit including a plurality of switches for operation by a driver;

assembling the airbag apparatus and the front section of the lower cover into an assembly unit by coupling the front section and the case of the airbag apparatus such that the front section covers the opening of the case;

mounting the assembly unit of the front section of the lower cover and the airbag apparatus to the column body by securing the case of the airbag apparatus to the column body;

attaching the switch unit to the column body at the rear of the airbag apparatus on a same line extending along the axial direction of the column body after mounting the assembly unit of the front section of the lower cover and the airbag apparatus on the column body; and mounting the upper cover and the rear section of the lower cover on the column body by screw fastening the upper cover and the rear section to the switch unit secured to the column body at a position on rear sides of the upper cover and the rear section.

\* \* \* \* \*